US012621826B2

(12) United States Patent
Fei et al.

(10) Patent No.: US 12,621,826 B2
(45) Date of Patent: May 5, 2026

(54) COMMUNICATION METHOD AND APPARATUS TO ENABLE A NETWORK DEVICE TO SUPPORT COMMUNICATION OF A NEW TYPE OF TERMINAL DEVICE WITHOUT ADDITIONALLY SENDING A SET OF COMPLETE SYSTEM INFORMATION

(71) Applicant: Huawei Technologies Co., Ltd., Shenzhen (CN)

(72) Inventors: Yongqiang Fei, Shenzhen (CN); Juan Zheng, Beijing (CN); Hailong Hou, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 854 days.

(21) Appl. No.: 17/853,528

(22) Filed: Jun. 29, 2022

(65) Prior Publication Data

US 2022/0338216 A1      Oct. 20, 2022

Related U.S. Application Data

(63) Continuation of application No. PCT/CN2019/130432, filed on Dec. 31, 2019.

(51) Int. Cl.
*H04W 72/231* (2023.01)
*H04L 41/0896* (2022.01)
(Continued)

(52) U.S. Cl.
CPC ..... *H04W 72/1263* (2013.01); *H04L 41/0896* (2013.01); *H04W 4/70* (2018.02);
(Continued)

(58) Field of Classification Search
CPC ... H04W 4/005; H04W 4/70; H04W 28/0215; H04W 72/25; H04W 72/231;
(Continued)

(56) References Cited

U.S. PATENT DOCUMENTS

2011/0269475 A1* 11/2011 Berggren .............. H04W 72/00
                                                        455/450
2015/0181575 A1* 6/2015 Ng ........................ H04L 5/0092
                                                        370/329
(Continued)

FOREIGN PATENT DOCUMENTS

CN       107006002 A      8/2017
EP       3063881 A1      9/2016
(Continued)

OTHER PUBLICATIONS

ETSI, "TS 138 331 V15.7.0", Oct. 2019, pp. 1-523 (Year: 2019).*
(Continued)

*Primary Examiner* — Salvador E Rivas
(74) *Attorney, Agent, or Firm* — Leydig, Voit & Mayer, Ltd.

(57) ABSTRACT

A communication method and apparatus relate to the field of communication technologies, to enable a network device to support communication of a new type of terminal device without additionally sending a set of complete system information. The method includes: The network device sends a SIB1 and supplementary information. Maximum transmission bandwidth of a first terminal device is different from that of a second terminal device. The supplementary information includes first information and/or second information, the SIB1 does not include the first information, and a parameter value of the second information included in the supplementary information is different from a parameter value of the second information included in the SIB1. After receiving the SIB1 and the supplementary information, the
(Continued)

second terminal device accesses a network based on partial information other than the second information in the SIB1 and the supplementary information. Consumed resources for downlink transmission can be reduced.

15 Claims, 5 Drawing Sheets

(51) Int. Cl.

| | |
|---|---|
| *H04W 4/70* | (2018.01) |
| *H04W 28/02* | (2009.01) |
| *H04W 72/1263* | (2023.01) |
| *H04W 72/23* | (2023.01) |
| *H04W 72/40* | (2023.01) |
| *H04W 72/52* | (2023.01) |
| *H04L 27/26* | (2006.01) |
| *H04W 72/25* | (2023.01) |
| *H04W 74/0833* | (2024.01) |

(52) U.S. Cl.
CPC ....... *H04W 28/0215* (2013.01); *H04W 72/23* (2023.01); *H04W 72/231* (2023.01); *H04W 72/40* (2023.01); *H04W 72/52* (2023.01); *H04L 27/2666* (2013.01); *H04W 72/25* (2023.01); *H04W 74/0833* (2013.01)

(58) Field of Classification Search
CPC ................ H04W 72/40; H04W 74/008; H04L 41/0896; H04L 27/2666
See application file for complete search history.

(56) References Cited

U.S. PATENT DOCUMENTS

| | | | | |
|---|---|---|---|---|
| 2016/0088595 | A1* | 3/2016 | You ........................ | H04W 74/04 |
| | | | | 370/329 |
| 2017/0325049 | A1 | 11/2017 | Basu Mallick et al. | |

| | | | | |
|---|---|---|---|---|
| 2018/0124685 | A1* | 5/2018 | Jha ........................... | H04W 4/70 |
| 2018/0139625 | A1* | 5/2018 | Breuer .................. | H04W 72/53 |
| 2019/0239047 | A1 | 8/2019 | Kim et al. | |
| 2020/0034124 | A1* | 1/2020 | Rahmathali ............... | G06F 8/38 |
| 2021/0045054 | A1* | 2/2021 | Liu ........................ | H04L 5/0048 |
| 2021/0168577 | A1* | 6/2021 | Ye ......................... | H04L 5/0094 |

FOREIGN PATENT DOCUMENTS

| | | |
|---|---|---|
| EP | 3286956 A1 | 2/2018 |
| WO | 2015066645 A1 | 5/2015 |
| WO | 2016172293 A1 | 10/2016 |

OTHER PUBLICATIONS

"SIB for Rel-13 low complexity and coverage enhanced UEs," 3GPP TSG-RAN WG2 #90, Fukuoka, Japan, Tdoc R2-152645, pp. 1-7, 3rd Generation Partnership Project, Valbonne, France (May 25-29, 2015).

"Frequency location scheduling for low cost MTC UEs," 3GPP TSG RAN WG1 Meeting #76bis, Shenzhen, China, R1-141117, Total 6 pages, 3rd Generation Partnership Project, Valbonne, France (Mar. 31-Apr. 4, 2014).

Huawei et al., "SIB for Rel-13 low complexity MTC," 3GPP TSG-RAN WG2 #89bis, Bratislava, Slovakia, R2-151389, Total 5 pages, 3rd Generation Partnership Project, Valbonne, France (Apr. 20-24, 2015).

Interdigital, "SIB transmission for MTC," 3GPP TSG RAN WG1 Meeting #81, Fukuoka, Japan, R1-153246, Total 3 pages, 3rd Generation Partnership Project, Valbonne, France (May 25-29, 2015).

* cited by examiner

SIB1

COMMUNICATION METHOD AND APPARATUS TO ENABLE A NETWORK DEVICE TO SUPPORT COMMUNICATION OF A NEW TYPE OF TERMINAL DEVICE WITHOUT ADDITIONALLY SENDING A SET OF COMPLETE SYSTEM INFORMATION

CROSS-REFERENCE TO RELATED APPLICATIONS

This application is a continuation of International Application No. PCT/CN2019/130432, filed on Dec. 31, 2019, the disclosure of which is hereby incorporated by reference in its entirety.

TECHNICAL FIELD

This application relates to the field of wireless communication technologies, and in particular, to a communication method and apparatus.

BACKGROUND

In new radio (NR), a base station broadcasts a system information block 1 (SIB1). The SIB1 includes system information required for accessing a network. Therefore, terminal devices such as a smartphone and a tablet computer may receive the SIB1, and access the network based on the system information in the SIB1, to implement communication between the terminal devices and the base station. However, for a new type of terminal device such as a machine type communication (MTC) terminal or an internet of things (IoT) device, system information required by the new type of terminal device to access the network may be different from system information required by the terminal device such as the smartphone. In this case, the new type of terminal device cannot access the network based on the SIB1. As a result, communication of the new type of terminal device is not supported in NR currently.

SUMMARY

The present disclosure provides a communication method and apparatus, to enable a network device to indicate communication of a new type of terminal device (such as an MTC terminal, an IoT device, or a capability-reduced terminal) without additionally sending a set of complete system information, thereby improving resource utilization of a communication system.

According to a first aspect, an embodiment provides a communication method, specifically including: A network device sends a SIB1 and supplementary information. The SIB1 includes access configuration information of a first terminal device, and/or scheduling information of another system information block. The supplementary information is used to indicate access of a second terminal device, and maximum transmission bandwidth of the first terminal device is different from that of the second terminal device. The supplementary information includes at least one of first information and second information, the SIB1 does not include the first information, and a parameter value of the second information included in the supplementary information is different from a parameter value corresponding to the second information in the SIB1.

After receiving the SIB1 and the supplementary information, the second terminal device accesses a network based on the SIB1 and the supplementary information.

In this embodiment, the network device sends the SIB1 and the supplementary information, so that the second terminal device can access the network based on the SIB1 and the supplementary information, and the network device can support the second terminal device without affecting supporting communication of the first terminal device. In addition, the supplementary information may not include information that is to be used by the second terminal device and that is included in the SIB1. Therefore, compared with sending a complete and new SIB1, this method helps reduce downlink resource overheads.

It should be noted that the first information or the second information may be understood as information that needs to be used by the second terminal device and that is not included in the SIB1, or information that needs to be used by the second terminal device and that is different from the information included in the SIB1.

In an embodiment, the supplementary information further includes first indication information, and the first indication information is used to indicate the second terminal device not to use third information in the SIB1. In this case, for example, the second terminal device accesses the network based on partial information other than the second information and the third information in the SIB1 and the supplementary information.

The supplementary information includes the first indication information, so that the second terminal device can conveniently determine information that is to be used and that is in the SIB1.

In an embodiment, the supplementary information further includes second indication information, and the second indication information is used to indicate the second terminal device to use fourth information in the SIB1. In this case, for example, the second terminal device accesses the network based on the fourth information in the SIB1 and the supplementary information.

The supplementary information includes the second indication information, so that the second terminal device can conveniently determine information that is to be used and that is in the SIB1.

In an embodiment, the second information includes random access configuration information of the second terminal device, and/or the second information includes scheduling information of another system information block of the second terminal device.

In an embodiment, the first information includes time domain resource indication information, the time domain resource indication information is used to indicate a valid time domain resource for receiving and/or sending information by the second terminal device, and the valid time domain resource is a subset of time domain resources for receiving and/or sending information by the first terminal device. Therefore, the second terminal device can conveniently identify time domain resources on which information can be received and/or sent, thereby avoiding impact of receiving and/or sending information by the second terminal device on receiving and/or sending information by the first terminal device.

In an embodiment, the supplementary information is sent by using the SIB1. Based on the foregoing technical solution, a manner for scheduling an existing SIB1 does not need to be changed, and only the supplementary information needs to be included in an SIB1. Compared with the existing SIB1, the SIB1 has an increased payload, but a change to a communication manner for an existing wireless communication system is small. This helps simplify an implementation of sending the supplementary information.

In an embodiment, a transmission resource for the supplementary information is predefined. Based on the foregoing technical solution, a manner for scheduling an existing SIB1 does not need to be changed, and a change to the communication manner for the existing wireless communication system is small. This helps simplify an implementation of sending the supplementary information. In addition, in this technical solution, a size of a payload of the SIB1 may not be changed. This helps avoid impact of sending the supplementary information on sending the SIB1.

In an embodiment, the transmission resource for the supplementary information is scheduled by using first resource indication information, a transmission resource for the SIB1 is scheduled by using second resource indication information, and the first resource indication information and the second resource indication information are carried in first downlink control information. Based on the foregoing technical solution, the supplementary information and the SIB1 can be scheduled by using the same downlink control information, so that an implementation of scheduling the supplementary information can be simplified, and flexibility of scheduling the supplementary information can be further improved.

In an embodiment, the transmission resource for the supplementary information is scheduled by using first resource indication information, a transmission resource for the SIB1 is scheduled by using second resource indication information, the first resource indication information is carried in first downlink control information, and the second resource indication information is carried in second downlink control information. Based on the foregoing technical solution, the supplementary information and the SIB1 can be separately scheduled by using two different pieces of downlink control information, so that an impact of scheduling the supplementary information on scheduling the SIB1 can be simplified, and the flexibility of scheduling the supplementary information can be further improved.

In an embodiment, the second terminal device is an internet of things terminal, a machine type communication terminal, or a reduced-capability terminal.

According to a second aspect, an embodiment provides a communication apparatus. The communication apparatus includes a processor and a communication interface.

The processor is configured to control or trigger the communication interface to send a SIB1 and supplementary information. The communication interface is configured to send the SIB1 and the supplementary information.

In an embodiment, the communication apparatus may further include a memory, configured to store program instructions and data. The memory is coupled to the processor. When executing the program instructions stored in the memory, the processor is configured to control or trigger the communication interface to send the SIB1 and the supplementary information.

The communication interface is used by the apparatus to communicate with another device. For example, the communication interface may be a transceiver, a circuit, a bus, a module, or another type of communication interface, and the another device may be a network device, a terminal device, or the like.

According to a third aspect, an embodiment provides another communication apparatus. The communication apparatus includes a processing module and a transceiver module. The processing module is configured to control or trigger the transceiver module to send a SIB1 and supplementary information. The transceiver module is configured to send the SIB1 and the supplementary information.

According to a fourth aspect, an embodiment provides another communication apparatus. The communication apparatus includes a processor and a communication interface. The communication interface is configured to receive a SIB1 and supplementary information. The processor is configured to access a network based on the SIB1 and the supplementary information.

In an embodiment, the communication apparatus may further include a memory, configured to store program instructions and data. The memory is coupled to the processor. When executing the program instructions stored in the memory, the processor is configured to access the network based on the SIB1 and the supplementary information.

The communication interface is used by the apparatus to communicate with another device. For example, the communication interface may be a transceiver, a circuit, a bus, a module, or another type of communication interface, and the another device may be a network device, a terminal device, or the like.

According to a fifth aspect, an embodiment provides another communication apparatus. The communication apparatus includes a processing module and a transceiver module. The transceiver module is configured to receive a SIB1 and supplementary information. The processing module is configured to access a network based on the SIB1 and the supplementary information.

It should be noted that, in the communication apparatus in any one of the second aspect to the fourth aspect and the embodiments, for related descriptions of the SIB1 and the supplementary information, refer to the related descriptions in the first aspect. Details are not described herein again.

According to a sixth aspect, an embodiment of this application further provides a computer-readable storage medium, including instructions. When the instructions are run on a computer, the computer is enabled to perform the steps performed by the network device or the steps performed by the second terminal device in any one of the first aspect or the embodiments of the first aspect.

According to a seventh aspect, an embodiment of this application further provides a chip. The chip includes a processor, a communication interface, and a memory, and is configured to implement the steps performed by the network device or the steps performed by the second terminal device in any one of the first aspect or the embodiments of the first aspect.

According to an eighth aspect, an embodiment further provides a computer program product, including instructions. When the computer program product runs on a computer, the computer is enabled to perform the steps performed by the network device or the steps performed by the second terminal device in any one of the first aspect or the embodiments of the first aspect.

In addition, for technical effects brought by any possible design manner in the second aspect to the eighth aspect, refer to technical effects brought by different embodiments in the method part. Details are not described herein again.

DESCRIPTION OF EMBODIMENTS

Figure 1A:
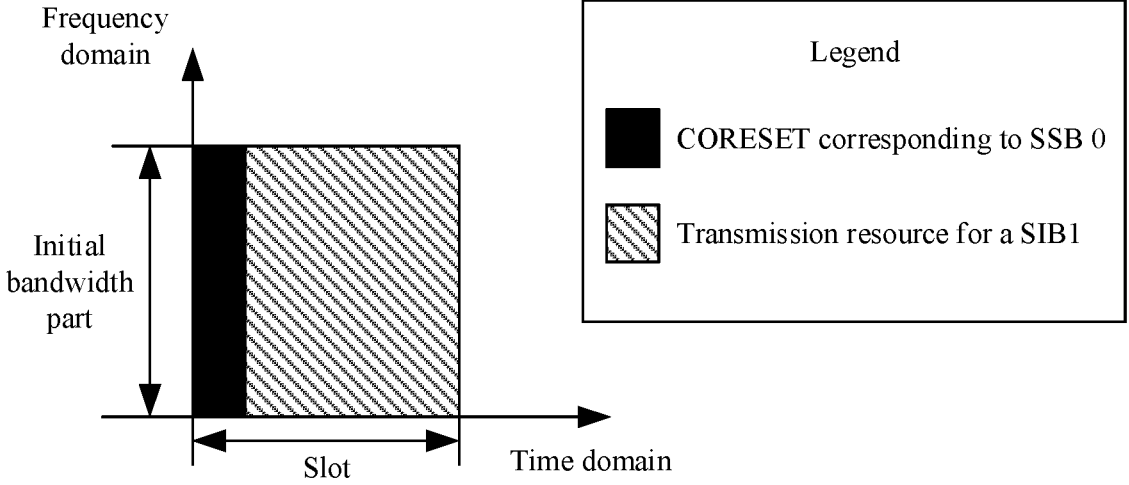
FIG. 1a is a schematic diagram of a transmission resource for a SIB1 according to an embodiment of this application.

It should be understood that "at least one" in embodiments herein refers to one or more. "A plurality of" means two or more than two. "And/or" describes an association relationship between associated objects, and indicates that three relationships may exist. For example, A and/or B may represent the following three cases: Only A exists, both A and B exist, and only B exists. A and B may be singular or plural. A character "/" generally indicates an "or" relationship between the associated objects. "At least one of the following" or a similar expression thereof indicates any combination of the following, and includes any combination of one or more of the following. For example, at least one of a, b, or c may represent seven cases: a, b, c, a and b, a and c, b and c, or a, b, and c, where each of a, b, and c may be an element, or may be a set including one or more elements.

Herein, "example", "in some embodiments", "in some other embodiments", or the like is used to represent giving an example, an illustration, or a description. Any embodiment or design scheme described as the "example" in this application should not be explained as being more preferred or having more advantages than another embodiment or design scheme. Exactly, the "example" is used to present a concept in a specific manner.

Herein, "of (of)" and "corresponding (corresponding)" may be interchangeably used sometimes. It should be noted that meanings expressed by the terms are consistent when differences are not emphasized. In embodiments of this application, communication and transmission may be interchangeably used sometimes. It should be noted that meanings expressed by the terms are consistent when differences are not emphasized. For example, transmission may include sending and/or receiving, and may be a noun or a verb.

It should be noted that, in embodiments herein, terms such as "first" and "second" are only used for a purpose of distinction in description, but should not be understood as an indication or implication of relative importance or an indication or implication of a sequence.

In a wireless communication system, generally, communication of a conventional terminal device such as a mobile phone or a tablet computer is supported. For example, a network device may broadcast a system information block 1 (system information clock, SIB1), and the SIB1 includes system information required for accessing a network, so that a terminal device can access the network based on the system information in the SIB1, to implement communication. However, for a new type of terminal device such as a machine type communication (machine type communication, MTC) terminal, an internet of things (internet of things, IoT) device, or a light terminal, a transmission characteristic of the new type of terminal device is different from a transmission characteristic of the conventional terminal device, for example, a low transmission capability, a low moving speed, or poor coverage, and the SIB1 is configured by the network device based on the transmission characteristic of the conventional terminal device. In this case, the new type of terminal device cannot access the network based on the SIB1. Consequently, the wireless communication system cannot support communication of the new type of terminal device.

In LTE, to support communication of the MTC terminal without affecting communication of the conventional terminal device, the network device additionally sends a bandwidth reduced (BR) SIB1 (SIB1-BR for short) to the MTC terminal in addition to sending the SIB1 to the conventional terminal device. The SIB1-BR and the SIB1 may have a same structure, but specific internal parameter values may be different. That is, in the LTE, the network device sends two sets of complete SIBs1, which easily causes large downlink resource overheads.

However, in NR, the network device may separately send synchronization signal blocks (SSBs) in different beam directions, so that transmit beam gains can be obtained in the different directions, and a coverage area is expanded. The SSBs sent in the different beam directions are different. Each SSB corresponds to a control resource set (CORESET) carrying DCI used to schedule the SIB1, so that the terminal device can receive the SIB1 on a corresponding downlink resource based on the DCI used to schedule the SIB1. The CORESET corresponding to the SSB is usually indicated by using pdcch-ConfigSIB1 information included in a MIB in the SSB. That is, the network device needs to send the SIB1 on a downlink resource indicated by each piece of DCI used to schedule the SIB1. It should be noted that, in one slot, downlink resources indicated by DCI that is used to schedule the SIB1 and that is in CORESETs corresponding to different SSBs may be the same or may be different, which is determined by the network device. However, content of the SIB1 carried on the downlink resources indicated by the DCI that is used to schedule the SIB1 and that is in the CORESETs corresponding to the different SSBs is the same.

Figure 1B:
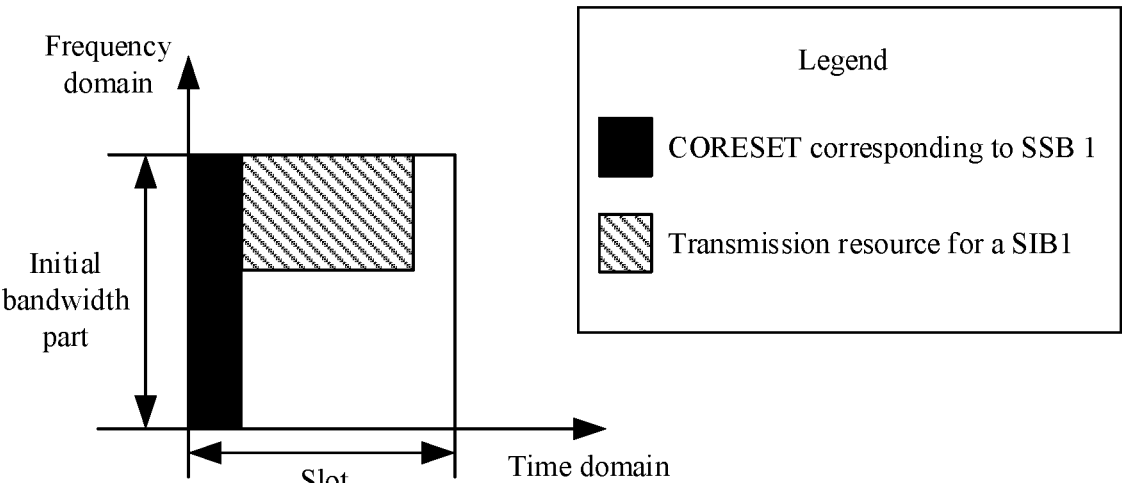
FIG. 1b is a schematic diagram of a transmission resource for another SIB1 according to an embodiment of this application.
Figure 1C:
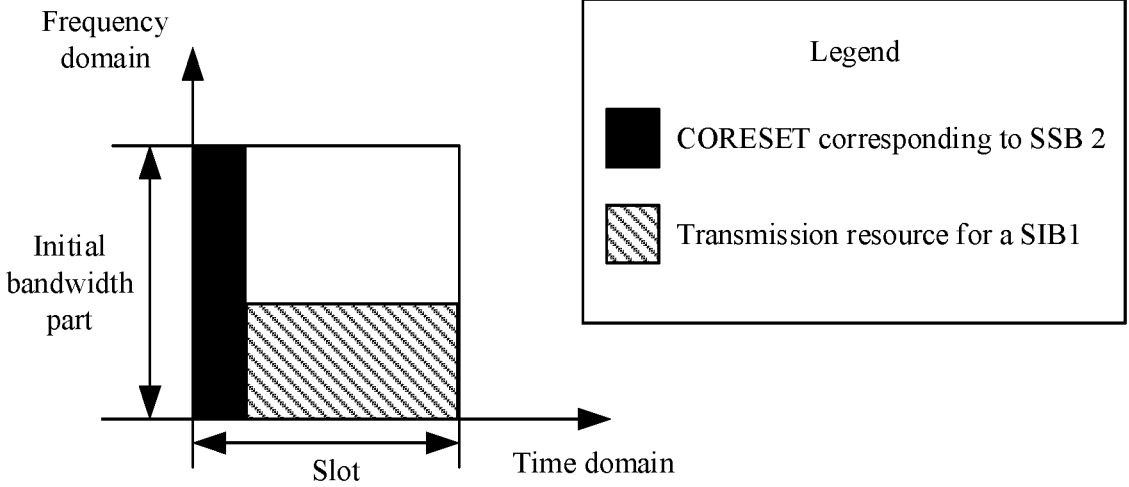
FIG. 1c is a schematic diagram of a transmission resource for another SIB1 according to an embodiment of this application.
Figure 1D:
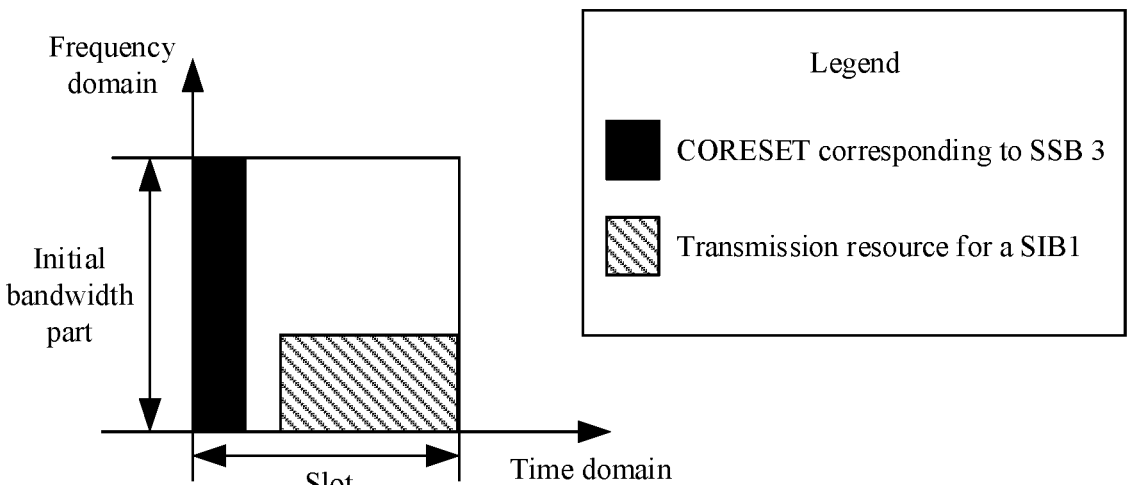
FIG. 1d is a schematic diagram of a transmission resource for another SIB1 according to an embodiment of this application.

For example, in NR, SSBs sent from different beam directions are SSB 0, SSB 1, SSB 2, and SSB 3. In one slot, a CORESET corresponding to SSB 0 and a downlink resource indicated by DCI that is used to schedule the SIB1 and that is carried on the CORESET corresponding to SSB 0 are shown in FIG. 1a, a CORESET corresponding to SSB 1 and a downlink resource indicated by DCI that is used to schedule the SIB1 and that is carried on the CORESET corresponding to SSB 1 are shown in FIG. 1b, a CORESET corresponding to SSB 2 and a downlink resource indicated by DCI that is used to schedule the SIB1 and that is carried on the CORESET corresponding to SSB 2 are shown in FIG. 1c, and a CORESET corresponding to SSB 3 and a downlink resource indicated by DCI that is used to schedule the SIB1 and that is carried on the CORESET corresponding to SSB 3 are shown in FIG. 1d.

Generally, when a size of a payload of the SIB1 remains unchanged, more downlink resources used to transmit the SIB1 indicates a lower transmission bit rate that can be used, so that transmission reliability and decoding reliability can be improved. Similarly, when downlink resources used to transmit the SIB1 remains unchanged, a smaller payload of the SIB1 indicates a lower transmission bit rate and higher decoding reliability. In NR, generally, the SIB1 is sent on an initial bandwidth part (initial bandwidth part, initial BWP). That is, the downlink resource indicated by the DCI that is used to schedule the SIB1 and that is carried on the CORE-SET corresponding to the SSB is not out of a bandwidth range of the initial BWP in frequency domain. The payload of the SIB1 may be close to 3000 bits at most. For an initial BWP with bandwidth of 5 MHz, to ensure a reliable bit rate, a frequency domain resource occupied by the SIB1 in one slot may need to occupy bandwidth of the entire initial BWP.

In this case, in NR, if the network device sends a new SIB1 (for example, SIB1-light or SIB1-MTC) to the new type of terminal device in addition to sending the SIB1 to the conventional terminal device, to support access and communication of the new type of terminal device, downlink resource overheads are easily doubled, and the communication of the conventional terminal device is affected.

In view of this, embodiments herein provide a communication method. The SIB1 is sent to the conventional terminal device, and information that is not included in the SIB1 and that is to be used by the new type of terminal device is further sent, so that the network device supports both the communication of the new type of terminal device and the communication of the conventional terminal device without sending a complete and new SIB1. This method helps reduce downlink resource overheads compared with sending the complete and new SIB1.

In the following, some terms of embodiments are described, to help a person skilled in the art have a better understanding.

1. Network Device

In embodiments herein, the network device is a device that provides a wireless communication function for a terminal device, and may alternatively be referred to as a radio access network (RAN) device or the like. The network device includes but is not limited to: a next generation NodeB (gNB), an evolved NodeB (eNB), a baseband unit (BBU), a transmission reception point (TRP), a transmission point (TP), a relay station, an access point, and the like in 5G. The network device may alternatively be a radio controller, a centralized unit (CU), a distributed unit (DU), or the like in a cloud radio access network (CRAN) scenario. The network device may support at least one wireless communication technology, such as NR or LTE.

2. First Terminal Device

In embodiments of this application, the first terminal device is a device having a wireless transceiver function, and may be referred to as a conventional terminal device, a common terminal device, a terminal, user equipment (UE), a mobile station (MS), a mobile terminal (MT), or the like. A specific form of the first terminal device may be a mobile phone, a cellular phone, a cordless phone, a session initiation protocol (SIP) phone, a wearable device, a tablet computer (pad), a desktop computer, a notebook computer, an all-in-one machine, a vehicle-mounted terminal, a wireless local loop (WLL) station, a personal digital assistant (PDA), or the like. The first terminal device may be applied to the following scenarios: virtual reality (VR), augmented reality (AR), industrial control, self-driving, or the like. The first terminal device may be fixed or movable. It should be noted that the first terminal device may support at least one wireless communication technology, such as NR or LTE.

3. Second Terminal Device

In embodiments herein, the second terminal device is also a device having the wireless transceiver function, and may be referred to as a new type of terminal device, new type of UE, or the like. A specific form of the second terminal device may be a capability-reduced terminal (also referred to as a low-capability terminal, such as an NR-light terminal or a reduced-capability NR Device), an internet of things terminal (such as an IoT device), a machine type communication terminal (such as an MTC device), or the like. It should be noted that, in embodiments of this application, the capability-reduced terminal may also be referred to as a light terminal. The second terminal device may be applied to the following scenarios: a smart grid, a smart city, a smart home, an industrial sensor network, sports and fitness, or the like. The second terminal device may be fixed or movable. It should be noted that the second terminal device may support at least one wireless communication technology, such as NR or LTE.

It should be noted that a transmission characteristic of the first terminal device is different from a transmission characteristic of the second terminal device. For example, that a transmission characteristic of the first terminal device is different from a transmission characteristic of the second terminal device may be understood as that at least one transmission performance parameter of the first terminal device is different from that of the second terminal device. For example, maximum transmission bandwidth of the first terminal device is different from maximum transmission bandwidth of the second terminal device, and/or a peak rate of the first terminal device is different from a peak rate of the second terminal device. For example, the maximum transmission bandwidth of the first terminal device is 100 MHz, and the maximum transmission bandwidth of the second terminal device is 20 MHz or 5 MHz. For another example, the peak rate of the first terminal device is 500 MHz/s, and the peak rate of the second terminal device is 50 Mbps or 10 bps.

4. SIB1

The SIB1 in embodiments of this application includes access configuration information of the first terminal device, and/or scheduling information of another system information block (such as a SIB2 and a SIB3). For example, the SIB1 or the another system information block (such as the SIB2 or the SIB3) may be carried on a physical downlink control channel (PDSCH). The network device may carry, on a CORESET corresponding to an SSB, DCI for scheduling the SIB1. The CORESET corresponding to the SSB may be indicated by the network device to the first terminal device and/or the second terminal device by using a master information block (master information block, MIB) in the SSB. The MIB is usually carried on a physical broadcast channel (physical broadcast channel, PBCH). For example, the CORESET corresponding to the SSB may be CORESET 0. In addition, the SSB may further include a primary synchronization signal (PSS) and a secondary synchronization signal (SSS). The PSS and the SSS may be used by the first terminal device and/or the second terminal device for synchronization.

For example, information included in the SIB1 may be shown in Table 1.

TABLE 1

| Information number | Information name | Description |
|---|---|---|
| 1 | cellSelectionInfo | Cell selection information, including a measurement signal threshold, waiting time, and the like |
| 2 | cellAccessRelatedInfo | Cell access related information, such as an operator identifier |
| 3 | connEstFailureControl | Control information used when a connection with a cell fails to be established |
| 4 | si-SchedulingInfo | Scheduling information of the another SIB (such as the SIB2 and the SIB3) |
| 5 | servingCellConfigCommon | Cell common configuration information, such as uplink or downlink configuration information, SSB configuration information, or time division duplex (time division duplex, TDD) configuration information |
| 6 | ims-EmergencySupport | Indicating whether a cell supports a terminal device with restricted services in using an IP multimedia subsystem (internet protocol multimedia subsystem, IMS) emergency service. |
| 7 | eCallOverIMS-Support | Indicating whether the cell supports the terminal device with restricted services in making a call by using the IMS emergency service. |
| 8 | ue-TimersAndConstants | Timer-related configuration and constants |
| 9 | uac-BarringInfo | Access control parameters for services of different access types, for example, a probability of being allowed to access, a minimum re-access time interval after the access is rejected |
| 10 | useFullResumeID | Indicating a used resume identifier and whether a resume request message uses a complete message or a short message service message. |

It should be noted that Table 1 is merely an example for describing the information included in the SIB1, and does not constitute a limitation on the information included in the SIB1. In addition, the SIB1 may further include information other than the information in Table 1, for example, extended discontinuous reception (extended discontinuous reception, eDRX) permission information and a hyper frame number. This is not limited herein. In addition, it should be further noted that the terminal device in Table 1 may include the first terminal device, and/or the second terminal device.

5. Transmission Resource

In embodiments herein, the transmission resource may include a time domain resource, and/or a frequency domain resource. The time domain resource and the frequency domain resource may be referred to as a time-frequency resource for short. For example, the transmission resource for the SIB1 may be understood as a downlink resource carrying the SIB1, that is, a downlink time-frequency resource used when the network device sends the SIB1.

6. Time Domain Resource

In embodiments herein, the time domain resource may include one or more time units. For example, communication is performed between the network device and the first terminal device, between the network device and the second terminal device, between the first terminal devices, between the first terminal device and the second terminal device, or between the second terminal devices by using the time unit as a unit. The time unit may be a radio frame, a subframe, a slot, a micro-slot, a mini-slot, a symbol, or the like. It should be noted that, in embodiments of this application, duration of different time units may be the same, or may be different. This is not limited herein. For example, different subcarrier spacings correspond to time units with different duration. For example, the time unit is a slot. For example, when a subcarrier spacing is 15 kHz, duration of one slot may be 1 ms; and when a subcarrier spacing is 30 kHz, duration of one slot may be 0.5 ms.

Figure 2:
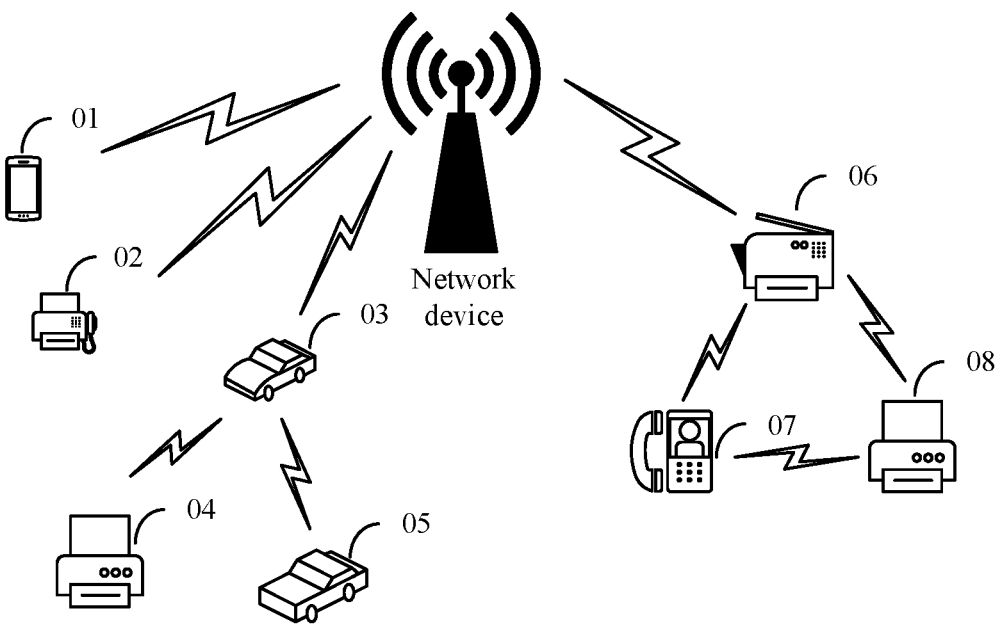
FIG. 2 is a network architectural diagram of a communication system according to an embodiment of this application.

Embodiments herein may be applied to an NR communication system, or may be applied to an LTE communication system, or may be applied to another communication system, for example, a future mobile communication system (for example, a 6G communication system). For example, FIG. 2 is a schematic diagram of a network architecture of a communication system according to an embodiment of this application. The communication system includes a network device, a terminal device 01, a terminal device 02, a terminal device 03, a terminal device 04, a terminal device 05, a terminal device 06, a terminal device 07, and a terminal device 08. The terminal device 01, the terminal device 03, the terminal device 05, and the terminal device 07 are first terminal devices, and the terminal device 02, the terminal device 04, the terminal device 06, and the terminal device 08 are second terminal devices.

In the communication system shown in FIG. 2, the terminal device 03, the terminal device 05, and the terminal device 06 may alternatively form a communication system. In this communication system, the terminal device 03 may send downlink information to the terminal device 05 and the terminal device 06. The communication method in embodiments of this application may alternatively be applied to the communication system including the terminal device 03, the terminal device 05, and the terminal device 06. In the communication system including the terminal device 03, the terminal device 05, and the terminal device 06, the terminal device 03 may be considered as the network device, the terminal device 05 is the first terminal device, and the terminal device 06 is the second terminal device. Similarly, embodiments of this application may alternatively be applied to a communication system that may include the terminal device 04, the terminal device 07, and the terminal device 08.

It should be understood that, the network architecture of the communication system shown in FIG. 2 is merely an example, and does not constitute a limitation on the network architecture of the communication system in this embodiment of this application. A quantity of network devices, a quantity of first terminal devices, and a quantity of second terminal devices in the communication system are not limited in this embodiment of this application. For example, when the communication system in this embodiment of this application includes a plurality of network devices, coordinated multipoint communication may be performed between a network device and a network device. For example, the communication system includes a plurality of macro base stations and a plurality of micro base stations. Coordinated multipoint communication may be performed between a macro base station and a macro base station, between a micro base station and a micro base station, or between a macro base station and a micro base station.

It should be noted that in this embodiment, the communication between the network device and the first terminal device, between the network device and the second terminal device, between the first terminal devices, between the first terminal device and the second terminal device, or between the second terminal devices may be performed by using a licensed spectrum, may be performed by using an unlicensed spectrum, or may be performed by using both a licensed spectrum and an unlicensed spectrum. This is not limited herein. The communication between the network device and the first terminal device, between the network device and the second terminal device, between the first terminal devices, between the first terminal device and the second terminal device, or between the second terminal devices may be performed by using a spectrum below 6 gigahertz (GHz), may be performed by using a spectrum above 6 GHz, or may be performed by using both a spectrum below 6 GHz and a spectrum above 6 GHz. That is, this application is applicable to both a low-frequency (for example, sub 6G) scenario and a high-frequency (above 6G) scenario.

The communication method in embodiments of this application is described in detail by using the network architecture of the communication system shown in FIG. 2 as an example.

Figure 3:
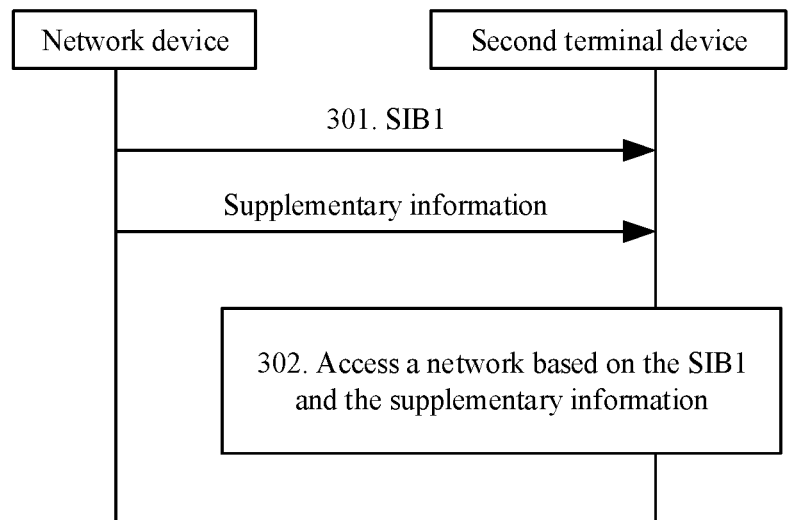
FIG. 3 is a schematic flowchart of a communication method according to an embodiment of this application.

For example, FIG. 3 is a communication method according to an embodiment. The method specifically includes the following steps.

Step 301. A network device sends a SIB1 and supplementary information. The supplementary information is used to indicate access of a second terminal device, and the supplementary information includes information that is indicated to be used by the second terminal device and that is not included in the SIB1.

For example, the information that is to be used by the second terminal device and that is not included in the SIB1 may include at least one of first information and second information, the SIB1 does not include the first information, and a parameter value corresponding to the second information in the SIB1 is different from a parameter value of the second information included in the supplementary information.

The first information may be understood as information that is not included in the SIB1 but required by the second terminal device for access. For example, when sending and/or receiving information, the second terminal device cannot use some time domain resources available for a first terminal device. For example, to avoid an adverse impact of transmission of the second terminal device on transmission of the first terminal device, the second terminal device should avoid using a high-payload time domain resource in the available time domain resources of the first terminal device, that is, the high-payload time domain resource in the available time domain resources of the first terminal device is unavailable for the second terminal device. However, the SIB1 does not include information indicating time domain resources available or time domain resources unavailable for the second terminal device. In this case, the first information may include time domain resource indication information. The time domain resource indication information is used to indicate a valid time domain resource for sending and/or receiving information by the second terminal device. The valid time domain resource for sending and/or receiving information by the second terminal device is indicated, so that unnecessary transmission can be reduced, consumed energy can be reduced, and the adverse impact of transmission of the second terminal device on transmission of the first terminal device can be avoided. For example, the valid time domain resource may be a subset of time domain resources for receiving and/or sending information by the first terminal device.

It should be noted that the time domain resource indication information may alternatively be referred to as a valid time domain resource indication (validtime resourceinfo), a valid slot indication (vaildSlotLight), or the like. This is not limited herein.

Figure 4:
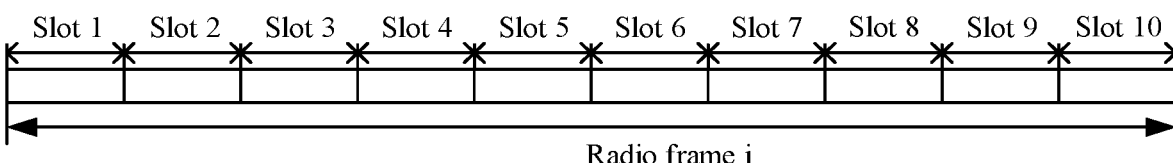
FIG. 4 is a schematic structural diagram of a radio frame according to an embodiment of this application.

For example, a time domain resource indication may be indicated by a bitmap. For example, the time domain resource for receiving and/or sending information by the first terminal device is a first time domain resource. For example, the first time domain resource may be one radio frame, or N time units included in one radio frame. N is a positive integer. For example, the first time resource is a radio frame i, and the time unit is a slot. As shown in FIG. 4, the radio frame i includes slot 1 to slot 10. The first terminal device may use slot 1 to slot 10 in the radio frame i to receive and/or send information. If the valid time domain resources are slot 3 to slot 5, the second terminal device may use slot 3 to slot 5 in the radio frame i to receive and/or send information. For example, when the second terminal device can use a slot in the radio frame i to receive and/or send information, a bit value of 1 may be used for indication; or when the second terminal device cannot use a slot in the radio frame i to receive and/or send information, a bit value of 0 may be used for indication. In this case, the time domain resource indication may indicate the valid time domain resources in the radio frame i by using 0011100000. For example, in this embodiment of this application, duration of one radio frame may be 10 ms, and a quantity of slots included in one radio frame varies with different subcarrier spacings. For example, for a subcarrier spacing of 15 kHz, one radio frame includes 10 slots; and for a subcarrier spacing of 30 kHz, one radio frame includes 20 slots. When the radio frame i includes 20 slots, the time domain resource indication may indicate the valid time domain resources by using 20 bit values.

The foregoing is merely an example description of the time domain resource indication. In this embodiment, the valid time domain resource may alternatively be indicated in another manner. This is not limited herein.

It may be understood that, in FIG. 4, slot 3 to slot 5 are a subset of time domain resources for the radio frame i.

It should be noted that, in this embodiment, the information received and/or sent by the second terminal device by using the valid time domain resource may be data, control information, system information, or the like. This is not limited herein.

For example, the second information may be understood as information required by both the first terminal device and the second terminal device for access, but a parameter value of the information used by the first terminal device for access is different from that of the information used by the second terminal device for access. That is, the second information may be understood as information that has a same meaning but different parameter values and that is included in the SIB1 and the supplementary information. For example, if a transmission manner or transmission content of another system information block in the second terminal device is different from a transmission manner or transmission content of another system information block in the first terminal device, the second information may include scheduling information of the another system information block. Scheduling information of another system information block in the supplementary information is scheduling information of the another system information block of the second terminal device. The SIB1 also includes scheduling information of another system information block, and the scheduling information is scheduling information of the another system information block of the first terminal device. A parameter value of the scheduling information of the another system information block of the second terminal device is different from a parameter value of the scheduling information of the another system information block of the first terminal device.

For another example, if a random access manner or a resource or a configuration used by the second terminal device for random access is different from a random access manner or a resource or a configuration used by the first terminal device for random access, the second information may include random access configuration information. Random access configuration information in the supplementary information is random access configuration information of the second terminal device. The SIB1 also includes random access configuration information, and the random access configuration information is random access configuration information of the first terminal device. A parameter value of the random access configuration information of the second terminal device is different from a parameter value of the random access configuration information of the first terminal device. For example, the random access configuration information may be a random access configuration index, and a random access configuration index in the supplementary information is used to indicate a time domain resource and a format for sending a random access pilot by the second terminal device.

When receiving the SIB1 and the supplementary information, the second terminal device performs corresponding communication or configuration by using the parameter value of the second information in the supplementary information, and may ignore the parameter value of the second information in the SIB1. When receiving the SIB1, the first terminal device performs corresponding communication or configuration by using the parameter value of the second information in the SIB1. Even if receiving the SIB1 and the supplementary information, the first terminal device ignores the parameter value of the second information in the supplementary information.

In some other embodiments, the second terminal device may not support some services supported by the first terminal device. Therefore, some information included in the SIB1 is not required by the second terminal device. For example, in this embodiment of this application, the network device may explicitly or implicitly indicate, to the second terminal device, information that is not to be used by the second terminal device and that is in the SIB1. In a possible implementation, the network device explicitly indicates, to the second terminal device, the information that is not to be used and that is in the SIB1. Specifically, the network device performs indication to the second terminal device by including first indication information in the supplementary information. In other words, the supplementary information may further include the first indication information. For example, the first indication information is used to indicate the second terminal device not to use third information in the SIB1. For example, the network device may indicate, by using one bit in the supplementary information, the second terminal device not to inherit fourth information in the SIB1. For example, for a parameter that is not defined in the supplementary information, the network device may indicate, by using the first indication information, the second terminal device not to use information that is in the SIB1 and that corresponds to the parameter.

For example, the first terminal device may support two sets of radio frequency modules with different frequencies, to perform uplink transmission on a cell carrier and a supplementary carrier. However, due to limitations of costs and complexity, the second terminal device may not support two sets of radio frequency modules. Therefore, the third information may include supplementary uplink configuration information (supplementaryUplink) in the SIB1. A parameter value of the supplementary uplink configuration information is used to indicate a supplementary uplink carrier.

In another embodiment, when the network device implicitly indicates the second terminal device not to use the third information in the SIB1, specifically, the supplementary information may not include the first indication information. For example, in a predefined manner, when the supplementary information does not include the first indication information, the second terminal device may directly ignore or discard the third information in the SIB1.

In addition, in this embodiment, the network device may explicitly or implicitly indicate, to the second terminal device, information that is to be used by the second terminal device and that is in the SIB1. In an embodiment, the network device explicitly indicates, to the second terminal device, the information that is to be used and that is in the SIB1. For example, the network device performs indication to the second terminal device by including second indication information in the supplementary information. In other words, the supplementary information may further include the second indication information. For example, the second indication information is used to indicate the second terminal device to use the fourth information in the SIB1. For example, the fourth information may include information that is in the SIB1 and that is related to a characteristic of a cell, for example, information with information numbers of 1, 2, and 3 in Table 1, or information that is related to the characteristic of the cell and that is included in information with an information number of 5, for example, TDD configuration information of the cell. Because the information related to the characteristic of the cell is unrelated to a service and a transmission characteristic supported by the second terminal device, the second terminal device may also use the fourth information in the SIB1.

For example, the network device may indicate, by using one bit in the supplementary information, the second terminal device to inherit the fourth information in the SIB1. For example, for a parameter that is not defined in the supplementary information, the network device may indicate, by using the second indication information, the second terminal device to use information that is in the SIB1 and that corresponds to the parameter.

In another embodiment, when the network device implicitly indicates the second terminal device to use the fourth information in the SIB1, the supplementary information may not include the second indication information. For example, in a predefined manner, when the supplementary information does not include the second indication information, the second terminal device may directly obtain the fourth information from the SIB1 based on a requirement of the second terminal device.

It should be noted that the access of the second terminal device in this embodiment may include initial access, re-access, random access, or the like of the second terminal device. After the second terminal device accesses a network, the network device may identify and serve the second terminal device.

In addition, the supplementary information in this embodiment of this application may alternatively be referred to as SIB1-supplement information (SIB1-sup), or may have another name. A name of the supplementary information is not limited in this embodiment of this application.

Step 302. After receiving the SIB1 and the supplementary information, the second terminal device accesses a network based on the SIB1 and the supplementary information. After receiving the SIB1 and the supplementary information, the first terminal accesses the network based on the SIB1.

For example, the second terminal device accesses the network based on the fourth information in the SIB1 and the supplementary information. The fourth information in the SIB1 is information that is in the SIB1 and that needs to be inherited by the second terminal device to access the network.

Figure 5:
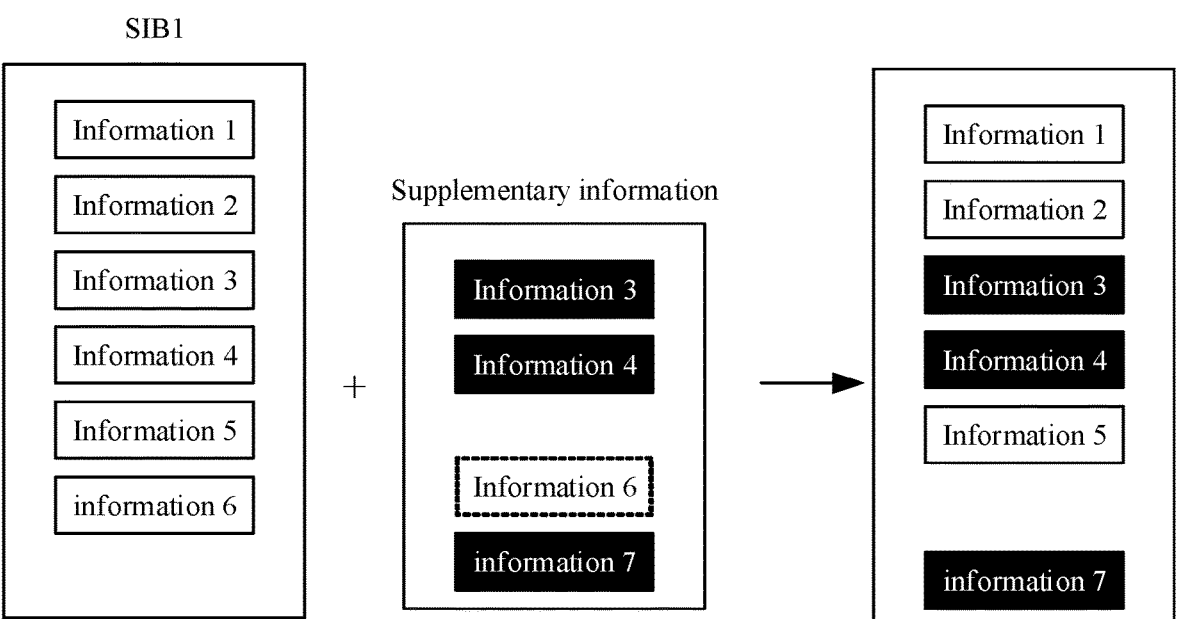
FIG. 5 is a schematic diagram of supplementary information and a SIB1 according to an embodiment of this application.

For example, as shown in FIG. 5, the SIB1 includes information 1, information 2, information 3, information 4, information 5, and information 6, and the supplementary information includes information 3, information 4, and information 7. Information 3, information 4, and information 7 are information that is to be used by the second terminal device and that is not included in the SIB1. For example, information 3 and information 4 are the second information, and information 7 is the first information. Information 6 is information that is in the SIB1 and that is not to be used by the second terminal device, namely, the third information. Information 1, information 2, and information 5 are information that is in the SIB1 and that are to be used by the second terminal device, namely, the fourth information. The second terminal device accesses the network based on information 1, information 2, and information 5 in the SIB1, and information 3, information 4, and information 7 in the supplementary information. Information 1, information 2, and information 5 in the SIB1, and information 3, information 4, and information 7 in the supplementary information may be understood as information included in the SIB1 of the second terminal device. In this case, the second terminal device accesses the network based on information 1, information 2, and information 5 in the SIB1, and information 3, information 4, and information 7 in the supplementary information.

In this embodiment, the network device may periodically broadcast the SIB1 and the supplementary information. A periodicity of broadcasting the SIB1 and a periodicity of broadcasting the supplementary information may be the same or may be different.

For example, the SIB1 and the supplementary information in this embodiment of this application may be two pieces of system information sent separately, or may be sent by using one message. In other words, the supplementary information is sent by using the SIB1.

When the supplementary information is sent by using the SIB1, a manner for scheduling an existing SIB1 does not need to be changed, and only the supplementary information needs to be included in the SIB1. A payload of a message corresponding to the SIB1 is increased, but a change to a communication manner for an existing wireless communication system is small. This helps simplify an implementation of sending the supplementary information.

When the SIB1 and the supplementary information are two pieces of system information sent separately, a transmission resource for the supplementary information may be predefined. For example, a transmission resource offset is predefined to indicate the transmission resource for the supplementary information. For example, the transmission resource offset may be an offset of the transmission resource for the supplementary information relative to a transmission resource for the SIB1 in time domain. The second terminal device may determine, based on the transmission resource offset and the transmission resource for the SIB1, time domain resources on which the supplementary information is to be received. Alternatively, a time domain resource location and/or a frequency domain resource location are/is predefined to indicate the transmission resource for the supplementary information. For example, the time domain resource location may be a slot number, and the frequency domain resource location may be a location of a physical resource block (physical resource block, PRB). In this embodiment of this application, the transmission resource for the supplementary information may be predefined directly or indirectly. The foregoing is merely an example for description, and does not constitute a limitation on this embodiment of this application. In this embodiment of this application, the transmission resource for the supplementary information may be predefined in another manner.

In some other embodiments, the transmission resource for the supplementary information is scheduled by using first resource indication information, a transmission resource for the SIB1 is scheduled by using second resource indication information, and the first resource indication information and the second resource indication information are carried in first downlink control information. That is, the first downlink control information includes the first resource indication information and the second resource indication information. In other words, the transmission resource for the first supplementary information and the transmission resource for the SIB1 are scheduled by using same downlink control information.

For example, a transmission manner of the first downlink control information may be a transmission manner of existing DCI for scheduling the SIB1, and the first downlink control information may be implemented by including the first resource indication information in the existing DCI for scheduling the SIB1. For example, the first resource indication information is transmitted by using a reserved bit or an unused redundant bit in the existing DCI for scheduling the SIB1. This manner makes a small change to an existing communication manner. This helps simplify implementation. The second terminal device may receive the supplementary information based on the first resource indication information in the first downlink control information, and receive the SIB1 based on the second resource indication in the first downlink control information. For the first terminal device, although the first downlink control information includes the first resource indication information and the second resource indication information, the first terminal device receives the SIB1 based on the second resource indication information in the first downlink control information, and may discard or ignore the first resource indication information in the first downlink control information.

In some still other embodiments, the transmission resource for the supplementary information is scheduled by using first resource indication information, a transmission resource for the SIB1 is scheduled by using second resource indication information, the first resource indication information is carried in first downlink control information, and the second resource indication information is carried in second downlink control information. That is, the transmission resource for the supplementary information and the transmission resource for the SIB1 may be scheduled by using two different pieces of downlink control information. In this case, the second terminal device needs to detect both the downlink control information for scheduling the SIB1 and the downlink control information for scheduling the supplementary information, and separately receive the SIB1 and the supplementary information based on the two pieces of downlink control information.

For example, the transmission resource for the first downlink control information may be the same as the transmission resource for the second downlink control information. For example, both the transmission resource for the first downlink control information and the transmission resource for the second downlink control information are CORESETs corresponding to an SSB. For the CORESET corresponding to the SSB, refer to the foregoing related descriptions. Details are not described herein again. Alternatively, the transmission resource for the first downlink control information may be indicated to the second terminal device by using the second downlink control information, or may be indicated to the second terminal device in another manner. This is not limited herein. In this manner, a transmission manner for an existing SIB1 may not need to be changed, or a small change is made to the transmission manner of the SIB1. In addition, the supplementary information and the SIB1 are transmitted on different transmission resources. This helps avoid that sending the supplementary information affects reliability of sending the SIB1.

For another example, the transmission resource for the first downlink control information may alternatively be predefined.

In addition, this embodiment of this application describes how to send system information when a SIB1 of the first terminal device is different from a SIB1 of the second terminal device, so that the wireless communication system can both support communication of the first terminal device and support communication of the second terminal device. It should be noted that this embodiment of this application may also be applicable to scenarios of another system information block (for example, a SIB2 or a SIB3) of the first terminal device and another system information block (for example, a SIB2 or a SIB3) of the second terminal device.

The foregoing embodiments may be used separately, or may be used in combination, to achieve different technical effects. This is not limited herein.

In embodiments herein, the communication method provided in embodiments of this application is described from a perspective of the network device and the second terminal device used as execution bodies. To implement functions in the communication method provided in embodiments of this application, the network device or the second terminal device may each include a hardware structure and/or a software module, and implement the functions in a form of the hardware structure, the software module, or a combination of the hardware structure and the software module.

Whether a specific function in the foregoing functions is performed by using the hardware structure, the software module, or the combination of the hardware structure and the software module depends on specific applications and design constraints of technical solutions.

Figure 6:
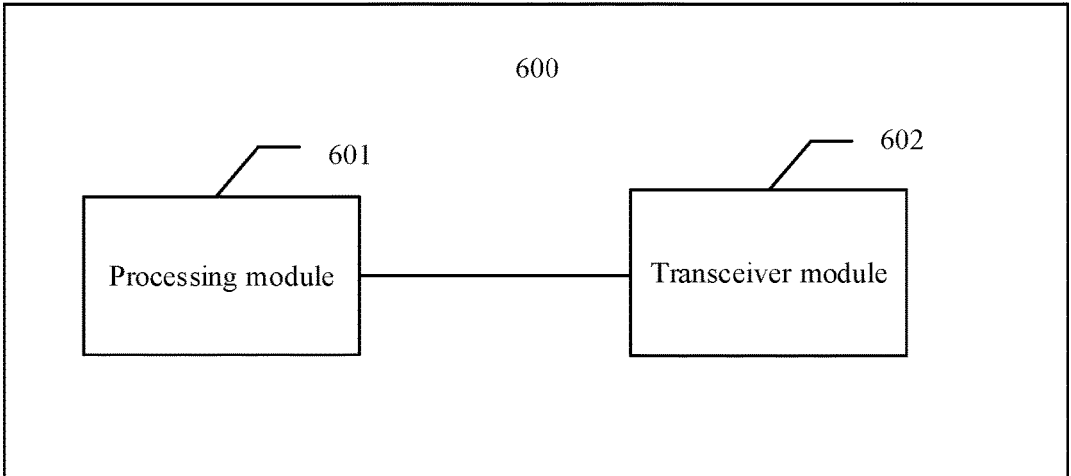
FIG. 6 is a schematic structural diagram of a communication apparatus according to an embodiment of this application.

Similar to the foregoing concept, as shown in FIG. 6, an embodiment further provides a communication apparatus 600. The communication apparatus 600 includes a transceiver module 602 and a processing module 601.

In an example, the communication apparatus 600 is configured to implement functions of the second terminal device in the foregoing method. The communication apparatus 600 may be the second terminal device, or may be an apparatus in the second terminal device. The communication apparatus may be a chip.

The transceiver module 602 is configured to receive a SIB1 and supplementary information. The processing module 601 is configured to access a network based on the SIB1 and the supplementary information.

In an example, the communication apparatus 600 is configured to implement functions of the network device in the foregoing method. The apparatus may be the network device, or may be an apparatus in the network device. The apparatus may be a chip.

The processing module 601 is configured to trigger or control the transceiver module 602 to send the SIB1 and the supplementary information.

For specific execution processes of the processing module 601 and the transceiver module 602, refer to the descriptions in the foregoing method embodiment. Division into modules in embodiments herein is an example, and is merely logical function division. During actual implementation, there may be another division manner. In addition, functional modules in embodiments herein may be integrated into one processor, or each of the modules may exist alone physically, or two or more modules are integrated into one module. The integrated module may be implemented in a form of hardware, or may be implemented in a form of a software functional module.

Figure 7:
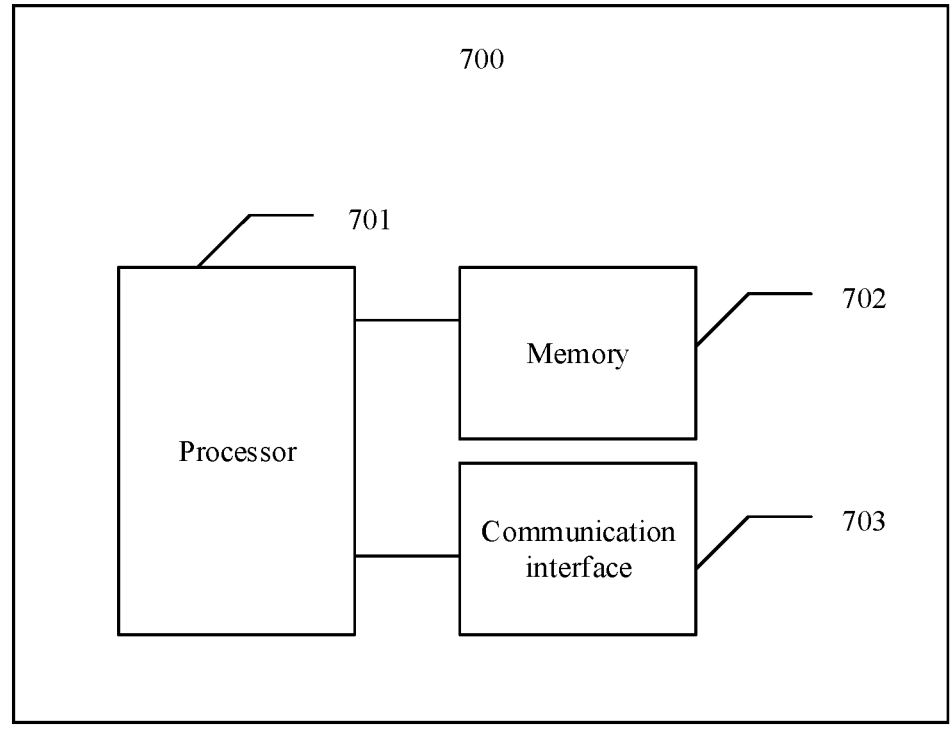
FIG. 7 is a schematic structural diagram of another communication apparatus according to an embodiment of this application.

Same as the foregoing concept, as shown in FIG. 7, an embodiment further provides a communication apparatus 700.

In an example, the communication apparatus 700 is configured to implement functions of the terminal device in the foregoing method. The communication apparatus 700 may be the second terminal device, or may be an apparatus in the second terminal device. The communication apparatus 700 includes at least one processor 701, configured to implement functions of the second terminal device in the foregoing method. For example, the processor 701 may be configured to access a network based on a SIB1 and supplementary information. For details, refer to detailed descriptions in the method. Details are not described herein again.

In some embodiments, the communication apparatus 700 may further include at least one memory 702, configured to store program instructions and/or data. The memory 702 is coupled to the processor 701. Coupling in this embodiment of this application is indirect coupling or a communication connection between apparatuses, units, or modules, may be in an electronic form, a mechanical form, or another form, and is used for information exchange between the apparatuses, the units, or the modules. In another implementation, the memory 702 may alternatively be located outside the communication apparatus 700. The processor 701 may operate in collaboration with the memory 702. The processor 701 may execute the program instructions stored in the memory 702. At least one of the at least one memory may be included in the processor.

In some embodiments, the communication apparatus 700 may further include a communication interface 703, configured to communicate with another device through a transmission medium, so that an apparatus in the communication apparatus 700 may communicate with the another device. For example, the communication interface 703 may be a transceiver, a circuit, a bus, a module, or another type of communication interface, and the another device may be a network device, another terminal device, or the like. The processor 7001 receives and sends information through the communication interface 703, and is configured to implement the method in the foregoing embodiments. For example, the communication interface 703 may be configured to receive the SIB1, the supplementary information, and the like.

In an example, the communication apparatus 700 is configured to implement functions of the network device in the foregoing method. The communication apparatus 700 may be the network device, or may be an apparatus in the network device. The communication apparatus 700 includes at least one processor 701, configured to implement the functions of the network device in the foregoing method. For example, the processor 701 may be configured to control sending of the SIB1, the supplementary information, and the like. For details, refer to detailed descriptions in the method. Details are not described herein again.

In some embodiments, the communication apparatus 700 may further include at least one memory 702, configured to store program instructions and/or data. The memory 702 is coupled to the processor 701. Coupling in this embodiment of this application is indirect coupling or a communication connection between apparatuses, units, or modules, may be in an electronic form, a mechanical form, or another form, and is used for information exchange between the apparatuses, the units, or the modules. In another implementation, the memory 702 may alternatively be located outside the communication apparatus 700. The processor 701 may operate in collaboration with the memory 702. The processor 701 may execute the program instructions stored in the memory 702. At least one of the at least one memory may be included in the processor.

In some embodiments, the communication apparatus 700 may further include a communication interface 703, configured to communicate with another device through a transmission medium, so that an apparatus in the communication apparatus 700 may communicate with the another device. For example, the communication interface 703 may be a transceiver, a circuit, a bus, a module, or another type of communication interface, and the another device may be a network device, another terminal device, or the like. The processor 701 receives and sends information through the communication interface 703, and is configured to implement the method in the foregoing embodiments. For example, the communication interface 703 may be configured to send the SIB1, the supplementary information, and the like.

In this embodiment, a connection medium between the communication interface 703, the processor 701, and the memory 702 is not limited. For example, in FIG. 7, in this embodiment of this application, the memory 702, the processor 701, and the communication interface 703 may be connected by using a bus. The bus may be classified into an address bus, a data bus, a control bus, or the like.

In this embodiment, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments herein, the memory may be a nonvolatile memory, such as a hard disk drive (HDD) or a solid-state drive (SSD), or may be a volatile memory, such as a random access memory (RAM). The memory is any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store program instructions and/or data.

All or some of the methods in embodiments herein may be implemented by using software, hardware, firmware, or any combination thereof. When the software is used to implement embodiments, all or some of the methods may be implemented in a form of a computer program product. The computer program product includes one or more computer instructions. When the computer program instruction is loaded and executed on a computer, all or some of procedures or functions according to embodiments herein are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clearly that a person skilled in the art can make various modifications and variations to this disclosure without departing from the scope of this disclosure. This application is intended to cover these modifications and variations of this application provided that they fall within the scope of protection defined by the following claims of this disclosure and their equivalent technologies.

What is claimed is:

1. A communication method, wherein the method comprises:

sending a system information block (SIB1), wherein the SIB1 comprises access configuration information of a first terminal device, and/or scheduling information of another system information block; and sending supplementary information using the SIB1, wherein the supplementary information is used to indicate access of a second terminal device, wherein a maximum transmission bandwidth of the first terminal device is different from a maximum transmission bandwidth of the second terminal device, wherein the second terminal device is an internet of things terminal, a machine type communication terminal, or a capability-reduced terminal, and wherein the supplementary information comprises at least one of first information and second information, the SIB1 does not comprise the first information, a parameter value of the second information comprised in the supplementary information is different from a parameter value corresponding to the second information in the SIB1, and the first terminal device ignores the parameter value of the second information in the supplementary information.

2. The method according to claim 1, wherein the supplementary information further comprises first indication information, and the first indication information is used to indicate to the second terminal device not to use third information in the SIB1.

3. The method according to claim 1, wherein the supplementary information further comprises second indication information, and the second indication information is used to indicate to the second terminal device to use fourth information in the SIB1.

4. The method according to claim 1, wherein the second information comprises random access configuration information of the second terminal device, and/or the second information comprises scheduling information of another system information block of the second terminal device.

5. The method according to claim 1, wherein the first information comprises time domain resource indication information, the time domain resource indication information is used to indicate a valid time domain resource for receiving and/or sending information by the second terminal device, and the valid time domain resource is a subset of time domain resources for receiving or sending information by the first terminal device.

6. The method according to claim 1, wherein a transmission resource for the supplementary information is determined using at least one of the following methods:

the transmission resource for the supplementary information is predefined; and the transmission resource for the supplementary information is scheduled using first resource indication information, a transmission resource for the SIB1 is scheduled using second resource indication information, and the first resource indication information and the second resource indication information are carried in first downlink control information; or the transmission resource for the supplementary information is scheduled using first resource indication information, a transmission resource for the SIB1 is scheduled using second resource indication information, the first resource indication information is carried in first downlink control information, and the second resource indication information is carried in second downlink control information.

7. A communication method, wherein the method is applied in a second terminal device, wherein the second terminal device is an internet of things terminal, a machine type communication terminal, or a capability-reduced terminal, and the method comprises:

receiving a system information block (SIB1), wherein the SIB1 comprises access configuration information of a first terminal device, and/or scheduling information of another system information block;

receiving supplementary information sent using the SIB1, wherein the supplementary information is used to indicate access of the second terminal device, wherein a maximum transmission bandwidth of the first terminal device is different from a maximum transmission bandwidth of the second terminal device, wherein the supplementary information comprises at least one of first information and second information, the SIB1 does not comprise the first information, a parameter value of the second information comprised in the supplementary information is different from a parameter value corresponding to the second information in the SIB1, and the first terminal device ignores the parameter value of the second information in the supplementary information; and accessing a network based on the SIB1 and the supplementary information.

8. The method according to claim 7, wherein the supplementary information further comprises first indication information, and the first indication information is used to indicate to the second terminal device not to use third information in the SIB1.

9. The method according to claim 7, wherein the supplementary information further comprises second indication information, and the second indication information is used to indicate to the second terminal device to use fourth information in the SIB1.

10. The method according to claim 7, wherein the second information comprises random access configuration information of the second terminal device, and/or the second information comprises scheduling information of another system information block of the second terminal device.

11. The method according to claim 7, wherein the first information comprises time domain resource indication information, the time domain resource indication information is used to indicate a valid time domain resource for receiving and/or sending information by the second terminal device, and the valid time domain resource is a subset of time domain resources for receiving or sending information by the first terminal device.

12. The method according to claim 7, wherein a transmission resource for the supplementary information is determined using at least one of the following methods:

the transmission resource for the supplementary information is predefined; and the transmission resource for the supplementary information is scheduled using first resource indication information, a transmission resource for the SIB1 is scheduled using second resource indication information, and the first resource indication information and the second resource indication information are carried in first downlink control information; or the transmission resource for the supplementary information is scheduled using first resource indication information, a transmission resource for the SIB1 is scheduled using second resource indication information, the first resource indication information is carried in first downlink control information, and the second resource indication information is carried in second downlink control information.

13. A communication apparatus, comprising a processor and a communication interface, wherein the processor is configured to control operations of the communication interface; and the communication interface is configured to send a system information block (SIB1) and supplementary information using the SIB1, wherein the SIB1 comprises access configuration information of a first terminal device, and/or scheduling information of another system information block; the supplementary information is used to indicate access of a second terminal device, the second terminal device is an internet of things terminal, a machine type communication terminal, or a capability-reduced terminal, and a maximum transmission bandwidth of the first terminal device is different from a maximum transmission bandwidth of the second terminal device; and the supplementary information comprises at least one of first information and second information, the SIB1 does not comprise the first information, a parameter value of the second information comprised in the supplementary information is different from a parameter value corresponding to the second information in the SIB1, and the first terminal device ignores the parameter value of the second information in the supplementary information.

14. The communication apparatus according to claim 13, wherein the second information comprises random access configuration information of the second terminal device, and/or the second information comprises scheduling information of another system information block of the second terminal device.

15. The communication apparatus according to claim 13, wherein the first information comprises time domain resource indication information, the time domain resource indication information is used to indicate a valid time domain resource for receiving and/or sending information by the second terminal device, and the valid time domain resource is a subset of time domain resources for receiving or sending information by the first terminal device.

* * * * *